THERMOPLASTIC INFORMATION STORAGE SYSTEM

Filed Aug. 25, 1958

Inventors
Sterling P. Newberry
James F. Norton
by I. David Blumenfeld
Their Attorney Inventors
Sterling P. Newberry
James F. Norton
by I. David Blumenfeld
Their Attorney Inventors
Sterling P. Newberry
James F. Norton
by I. David Blumenfeld
Their Attorney Inventors
Sterling P. Newberry
James F. Norton
by I. David Blumenfeld
Their Attorney Inventors
Sterling P. Newberry
James F. Norton
by I. David Blumenfeld
Their Attorney Inventors
Sterling P. Newberry
James F. Norton
by I. David Blumenfeld
Their Attorney

United States Patent Office 3,120,991

Patented Feb. 11, 1964

3,120,991
THERMOPLASTIC INFORMATION STORAGE SYSTEM

Sterling P. Newberry, Schenectady, and James F. Norton, Alplaus, N.Y., assignors to General Electric Company, a corporation of New York Filed Aug. 25, 1958, Ser. No. 757,081
9 Claims. (Cl. 346—77)

The present invention relates to information storage and more particularly to a method and apparatus for erasably storing such information on a deformable thermoplastic medium.

Recent investigations have shown that information storage on deformable storage media, such as thermoplastic materials, may be achieved by relatively simple techniques. A system utilizing such a thermoplastic medium for storing color television information (in the form of a composite diffraction grating) is disclosed in an application filed in the name of William E. Glenn, Jr., Serial No. 698,167, filed November 22, 1957, entitled "Method and Apparatus for Electronic Recording," abandoned and refiled as continuation-in-part application Serial No. 8,842, entitled "Method and Apparatus for Recording," filed February 15, 1960, now U.S. Patent No. 3,113,179—issued December 3, 1963, and assigned to the assignee of the present invention. In the above identified application, a system is disclosed for storing color as well as monochrome television information in response to an electrical input quantity. Electrons are deposited on a thermoplastic surface by an electron beam. Upon heating the thermoplastic the electrons are attracted towards the backside of the thermoplastic by electrostatic forces, deforming the softened thermoplastic producing deformations, the spacing and depth of which are determined by the electrical input controlling the beam. Upon cooling of the thermoplastic, the deformation pattern on the surface is frozen forming a composite diffraction grating which, upon transmission of light therethrough, produces a color pattern representative of the electrical input signals.

The term thermoplastic as utilized in the instant application is defined as any deformable polymeric material which is repeatedly fusible with the application of heat.

In order to utilize thermoplastic materials in high storage capacity systems, the spacing between the information storage sites must be reduced to a minimum consistent both with high storage density and accurate storage and read out. In order to achieve this desired high storage density, electron writing beams having extremely small cross-sectional areas as well as high beam currents are required.

In utilizing such minute electron writing beams, continuous observation and control of the beam characteristics, such as focal plane and focal depth, beam shape, beam position, etc., is necessary in order to insure that optimum operating characteristics are maintained during the entire storage process.

In addition, the thermoplastic storage medium must be monitored during various stages of the storage process to insure proper storage conditions. To achieve all of these desirable results the instant invention was conceived.

It is an object of this invention, therefore, to increase the storage density on a thermoplastic medium by reducing the spacing of the information representing deformations.

A further object of this invention is to provide a thermoplastic data storage apparatus in which the electron writing beam may be monitored during storage to insure maximum storage density.

Still another object of this invention is to provide a thermoplastic information storage apparatus in which the thermoplastic storage medium can be monitored during the various stages of the storage process.

In carrying out the instant invention, it is also useful to provide an erase mechanism for rapidly removing information which has been erroneously stored, or alternatively, to up-date stored information by erasing the old and storing the most recent. To do so rapidly and accurately, a mechanism must be provided for erasing the data at the same position at which storage takes place in order to minimize the size and complexity of the assembly.

Yet a further object of this invention, therefore, is to provide a thermoplastic storage apparatus wherein data may be stored and erased at the same position.

Other objects and advantages of the invention will become apparent as the description proceeds.

These and other objects are achieved, in one embodiment of the invention, by producing a finely focussed electron writing beam having a beam cross-section in the range of 5–.5 microns and preferably approximately 1.5$\mu$. The finely focussed electron writing beam impinges on a data storage element having a thermoplastic coating and forms, upon heating, predetermined deformation patterns in the form of surface undulations, the spacing and depth of which represents the desired information.

In order to insure optimum operation, a monitoring assembly is provided which permits observation of the electron writing beam to determine such beam characteristics as focal plane, beam shape and distribution, etc., permitting periodic adjustment of the beam characteristic. In addition, the monitoring assembly allows viewing of the storage element during various stages of the storage process to determine general surface conditions of the storage element before, during, and after storage to produce the best possible operating conditions without dismantling the assembly and removing the storage element.

The novel features which are believed to be characteristic of this invention are set forth with particularity in the appended claims. The invention itself however, both as to its organization and method of operation, together with further objects and advantages thereof, may best be understood by reference to the following description taken in connection with the accompanying drawing in which;

Figures 11, 12:
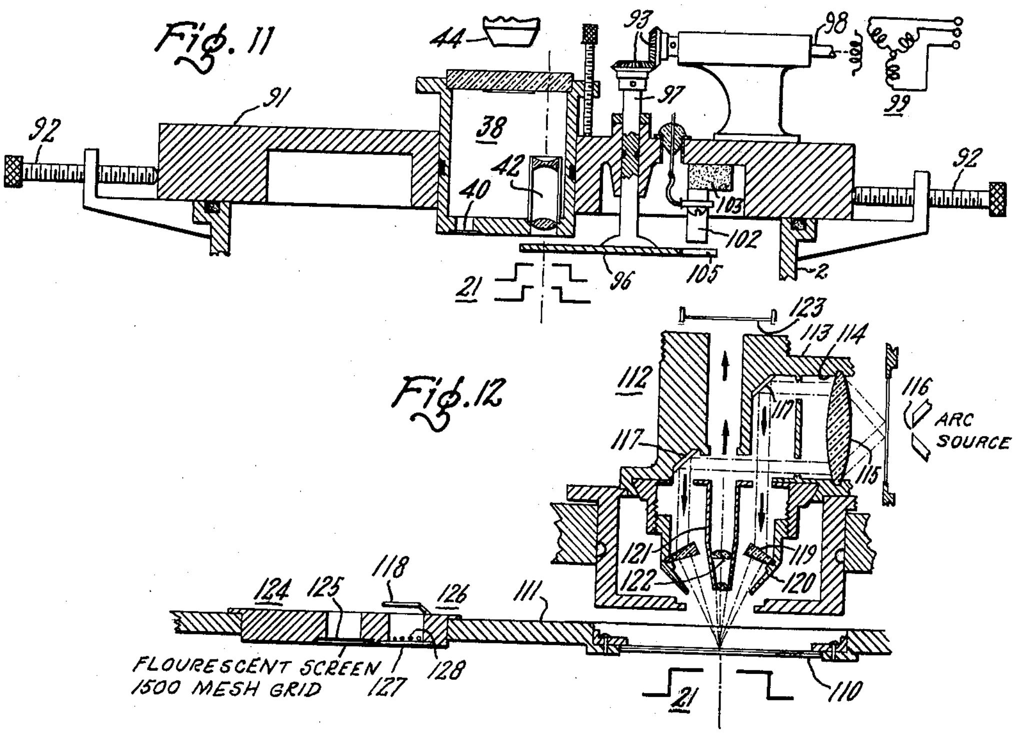
FIGURE 11 is an alternative construction of the monitoring head which may be utilized with the overall storage assembly of FIGURE 1.
FIGURE 12 is a fragmentary view showing of an alternative heating element which may be utilized with the apparatus of FIGURE 1.
Figure 13:
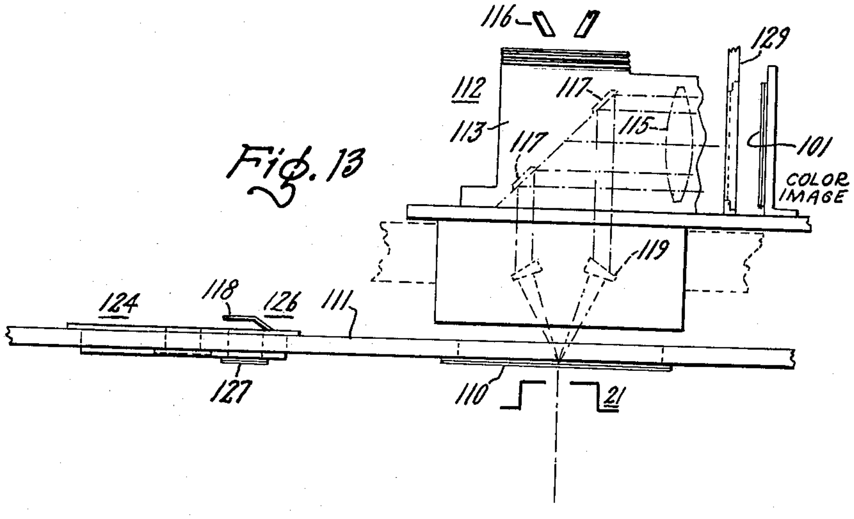
Figure 14:
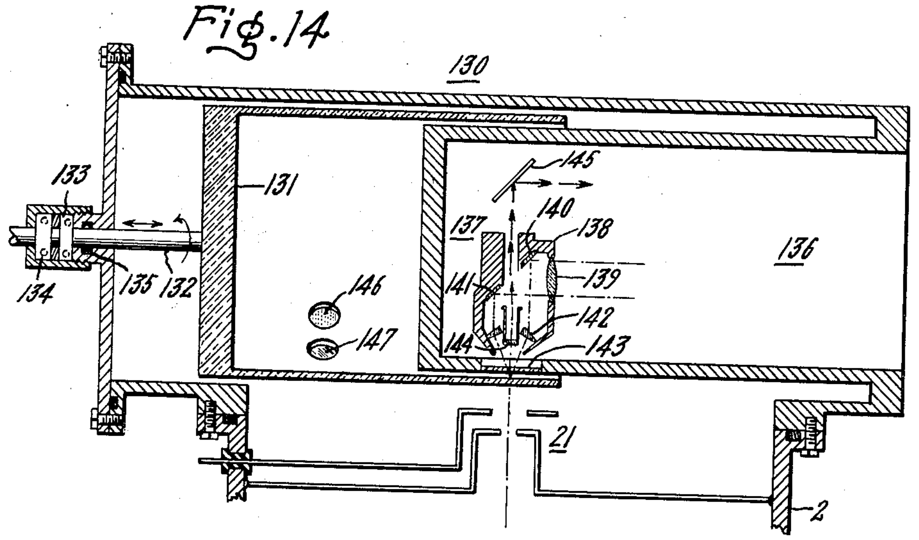
Figure 15:
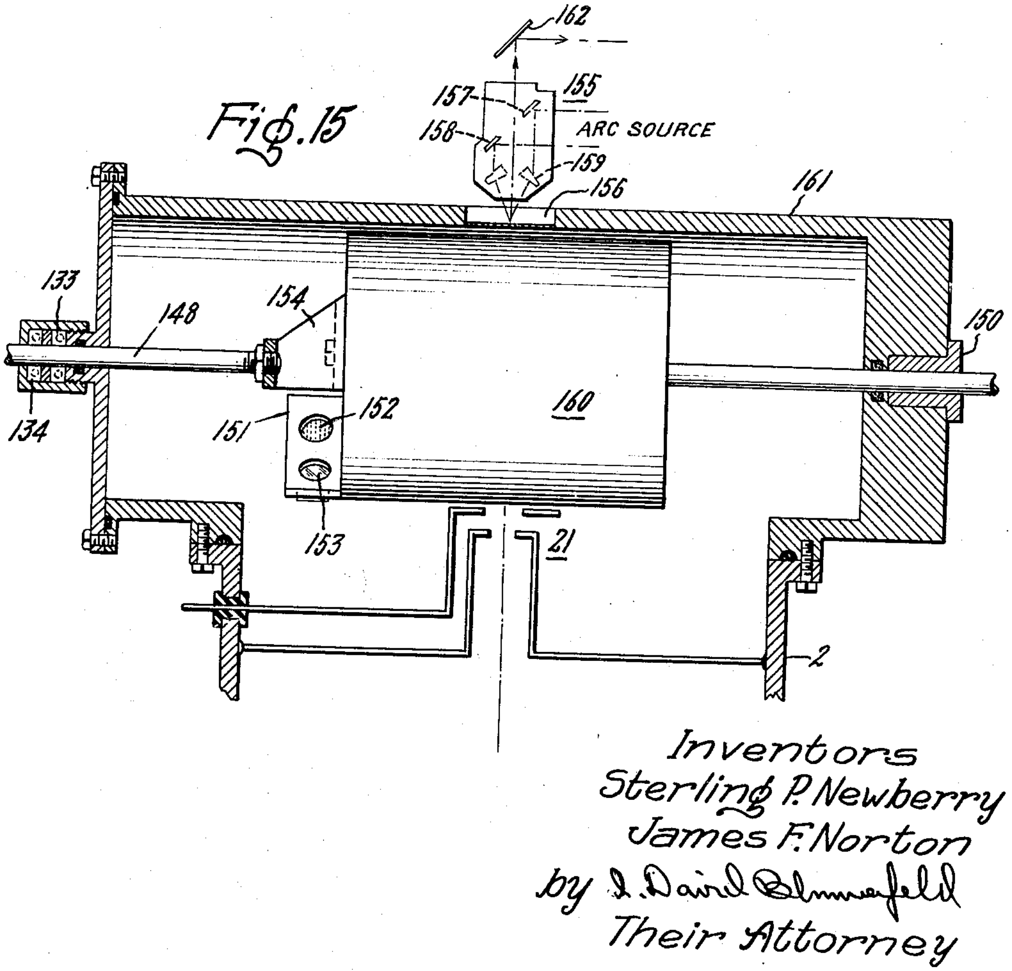

FIGURE 13 similarly shows an alternative embodiment of the heating device of FIGURE 12; and FIGURES 14 and 15 are yet further alternative constructions illustrating the use of drum-shaped thermoplastic storage elements.

Figure 1:
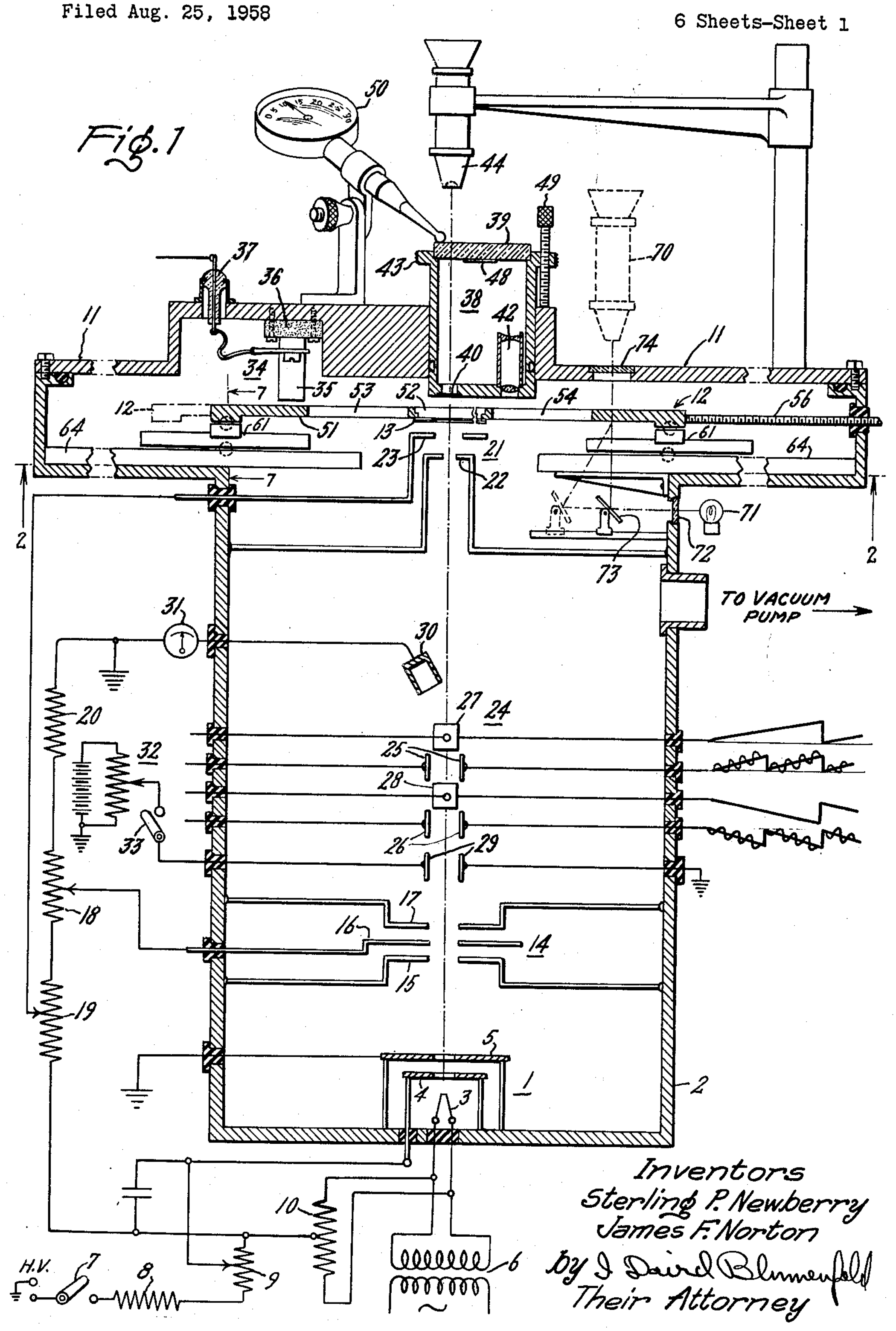
FIGURE 1 illustrates an embodiment of the information storage assembly of this invention.

FIGURE 1 illustrates one embodiment of a thermoplastic data storage system embodying the principles of the instant invention wherein information is stored on a thermo-plastic storage medium by producing predetermined deformation patterns in said thermoplastic medium in accordance with an electron pattern deposited thereon by a finely focussed electron beam writing probe. Simultaneously, a monitoring assembly in the storage means permits the observation of the electron writing beam as well as the thermoplastic storage medium to permit adjustment of the operating parameters to achieve optimum operating conditions.

Referring now to FIGURE 1 directly, a source of electrons is provided in the form of an electron gun assembly 1 retained in the lower portion of an evacuated housing 2 to produce a beam of electrons in the form of a flat sheet. The electron gun 1 comprises an electron emitting filament 3 having a flat surface extending in and out of the plane of the paper. Positioned over the filament 3 are control and accelerating electrodes 4 and 5 having their apertures aligned over the filament to form and accelerate the electrons into a flat beam.

Heater current for the filament 3 is provided through the secondary winding of a filament transformer 6, the primary winding of which is connected to a suitable source of alternating voltage. Operating potential for the filament is supplied from the negative terminal, indicated at —HV, of a high voltage supply through a starting switch 7, a pair of dropping resistances 8 and 9 and a center tapped shunt filament resistance 10. The control electrode 4 is connected to a point on the dropping resistance 9 and the accelerating electrode 5 is connected to ground to provide the proper operating potentials for these electrodes.

Access to the interior of the housing 2 may be had by removing a cover plate 11 fastened in vacuum-tight relation to the upper end of the housing 2 by means of screws or similar fastening devices. The housing itself is evacuated of gases and vapors by a suitable pumping system, not shown, through an exhaust port.

A beam collimating device 14, comprising three electrostatic field producing apertured plates 15, 16 and 17, is positioned above the electron gun 1. Each of the plates 15, 16 and 17 has its central aperture aligned along the beam path and convert the diverging electron beam from the gun into a flat beam of parallel or slightly converging electrons.

The central plate 16 of the device 14 is connected to the slider of a potentiometer resistance 18, one end of which is connected through resistances 8, 9 and 19 to the negative terminal of the high voltage supply and the other end through a resistance 20 to ground. The plates 15 and 17 are connected to the housing 2 which is normally at or near ground potential. An electrostatic field is thus produced in the lens assembly which modifies the electron trajectories to produce a flat sheet of parallel or slightly converging electrons. By virtue of the action described above, the collimating device 14 is called a condenser lens.

The flat electron beam passes through an electrostatic objective lens assembly 21 which demagnifies the beam and focusses it on a storage means 13. The lens 21 consists of a pair of apertured plates 22 and 23 positioned adjacent to the storage means 13 and produces an electrostatic field of such magnitude and configuration to demagnify the beam by reducing the cross-section in one dimension to a magnitude in the range of 5–.5 microns. Operating potential to produce the electrostatic field is provided by connecting the plate 22 to the housing 2 and the plate 23 to the movable slider of the potentiometer resistance 19. The field must be of such a magnitude that the focal length of the lens is very short, permitting a large demagnification of the beam and consequently, an extremely small beam cross-section. For a more detailed discussion of electrostatic lenses, their construction, field of configuration, and manner of operation, reference is made to the book "Electron Microscope" by D. Gabor, published by the Chemical Publishing Company, Inc. (1948), Brooklyn, New York, and specifically Chapters 2 and 3.

The term beam demagnification (M) as utilized throughout this application is defined as the ratio of the beam solid angle at the focal point of the objective lens assembly to the beam solid angle subtended at the exit of the electron gun assembly, where that ratio is greater than unity, i.e., $M>1$.

A thermoplastic storage means 13 is disposed in the beam path at the opposite end of the housing 2, and is movably supported in a suitable positioning means 12. The storage means which will be described in detail later, particularly with reference to FIGURE 3, includes a thermoplastic coating exposed to the writing beam, the surface of which is deformed, upon being heated and softened, into a predetermined deformation pattern representative of the electron pattern deposited on the surface by the writing beam.

Positioned along the beam path and between the condenser and objective lenses is a deflection system 24 to position the beam in space and sweep it over the storage medium 13. Horizontal deflection plate pairs 25 and 26 and corresponding vertical deflection plate pairs 27 and 28 are disposed along the beam path and deflect the beam in the desired manner upon application of deflection voltages. The horizontal and vertical deflection voltages are simultaneously applied to the individual horizontal and vertical plate pairs in polarity opposition to produce double deflection of the beam to minimize spherical aberration in the objective lens and provide adequate deflection of the beam. By utilizing two pairs of deflection plates in each plane and applying the deflection voltages to each pair of plates in polarity opposition, the electron beam is bent in opposite directions by each pair of plates to produce a resultant beam trajectory which passes through the center of the objective lens assembly for all beam deflection positions as well as permitting substantial angular deflection of the beam to provide scanning of the storage medium surface. If, as is customary in cathode ray devices, only one pair of deflection plates were used in each plane, only a small deflection angle is possible and in addition, the electron beam passes through the periphery of the lens aperture at the deflection positions away from the axis causing spherical aberration effects. Such effects, which may be defined as the separation of the lens focal planes for electrons passing through different portions of the lens relative to the axis, cause variations of the beam diameter with deflection posititon resulting in undesired variations of deformation spacing.

A beam holding means positions the electron beam away from the objective lens and storage means during non-storage intervals and includes a pair of "hold" deflection plates 29 to position the beam away from the lens 21. A fixed biasing deflection voltage to deflect the beam onto a Faraday cage 30 is supplied to the deflection plates 29 from a potentiometer 32 by closing a switch 33 whenever the beam is to be held off. The cage 30 is grounded through a microammeter 31 to provide a measure of the beam current magnitude. For the sake of simplicity of illustration and explanation, a manually operated switch is shown. It is apparent, however, that an electronic switching means, such as bistable multivibrator operated directly from a computer may be utilized to apply the "hold" deflection voltage to the deflection plates 29.

Figure 4:
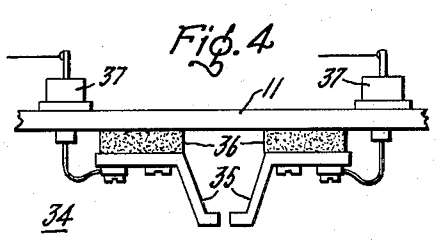
FIGURE 4 is a sectional view taken along the lines 4—4 of FIGURE 2 illustrating the R.F. heating electrodes.

In order to develop the desired deformation patterns on the surface of the thermoplastic storage means 13 from the electron pattern deposited on the surface of the thermoplastic coating by the beam, a heating means to bring the thermoplastic to a softened state is provided. A radio frequency heating means 34, comprising a pair of electrodes 35 (seen most clearly in FIGURE 4) positioned to form an R.F. gap is provided for this purpose. The electrodes 35 are fastened to the cover plate 11 and spaced therefrom by insulating spacers 36 and are connected to an external source of radio frequency voltage, not shown, by a suitable lead extending through an insulating bushing 37. The thermoplastic storage means 13 is periodically positioned below the electrodes 35 by the positioning means 12 to induce a circulating current from the radio frequency field in a thin conductive substrate, such as cuprous iodide (CuI), for example, in the thermoplastic storage means. This current flow heats the thermoplastic layer and brings it to a softened state and the electrostatic forces due to the electron pattern produce deformations, the spacing and depth of which depends upon the nature of the electron pattern, which deformations are frozen in the thermoplastic upon the cooling.

In order to maintain the proper operating conditions during storage, such parameters as writing beam shape, intensity, dimensions, focal plane, etc., must remain constant to avoid variations in the deformation spacing, etc. Any variations in the deformation patterns due to changes in these parameters introduce errors and inaccuracies since they do not represent information but are due to shifting operating characteristics. To reduce these effects to a minimum, a monitoring means for the electron writing beam and the thermoplastic storage means is incorporated into the storage apparatus. To this end, a rotatably mounted hollow cylindrical monitoring head 38 extends through the cover plate 11 into the interior of the housing 2 and is closed at one end by a transparent glass viewing plate 39 to allow the visual observation of a number of monitoring elements 40, 41 and 42 retained in the bottom of the cylinder. The three monitoring elements 40, 41 and 42 are so positioned (as may be seen in FIGURE 2) that each may be brought into alignment with the electron beam through manual rotation of the monitor head 38 by means of the knurled flanges 43.

Figure 5:
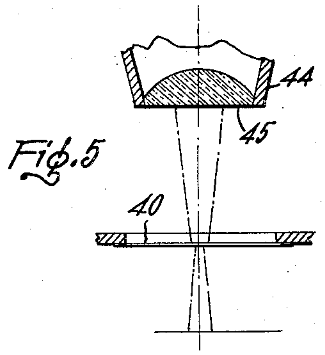
FIGURES 5 and 6 are schematic illustrations of portions of the beam monitoring assembly of FIGURE 1.

A transparent phosphor screen 40, secured to the bottom of head 38, is useful in determining the shape and current distribution of the writing beams by producing a visual representation thereof. As seen most clearly in the schematic illustration of FIGURE 5 the screen 40 is aligned with the objective lens 45 of a viewing light microscope 44. The screen 40 produces an enlarged luminescent image of the impinging beam which is viewed through the glass cover plate 39 and the microscope 44 to observe the shape and current distribution of the beam.

Figure 6:
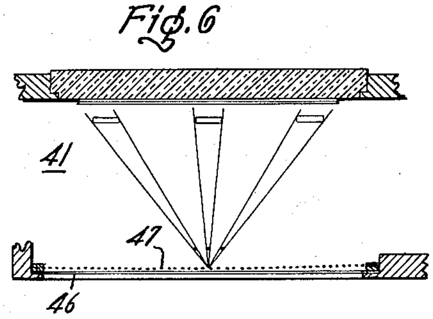

A beam shadow projection means 41 (seen most clearly in FIGURE 6) is also included in the monitoring head 38 and is utilized to determine the focal plane of the electron beam. The projection means 41 consists of a thin electron scattering gold target 46 approximately 1000 angstrom units thick and a silver grid structure 47 of 3 micron diameter bars formed into a 1500 mesh per inch grid. The target 46 scatters the impinging electrons which produce an enlarged shadow image of the grid 47 on a zinc sulfide fluorescent screen 48 positioned on the under side of the glass plate 39. This enlarged image of the grid may be observed at various axial positions of the monitor head 38, by manipulating the height adjusting screw 49, to determine the actual beam focal plane and depth of beam focus from the sharpness of the projected shadow image. A dial gage indicator 50 indicates the axial position of the head 38 to facilitate the determination of the beam focal plane.

In addition to the beam monitoring means 40 and 41, a magnifying relay lens assembly 42 may be periodically brought into alignment with the electron beam and the microscope 44, permitting observation of the thermoplastic storage medium 13 during various stages of the storage process with the incandescent electron emitting filament 3 of the electron gun 1 serving as the illuminating source for this purpose.

Figure 2:
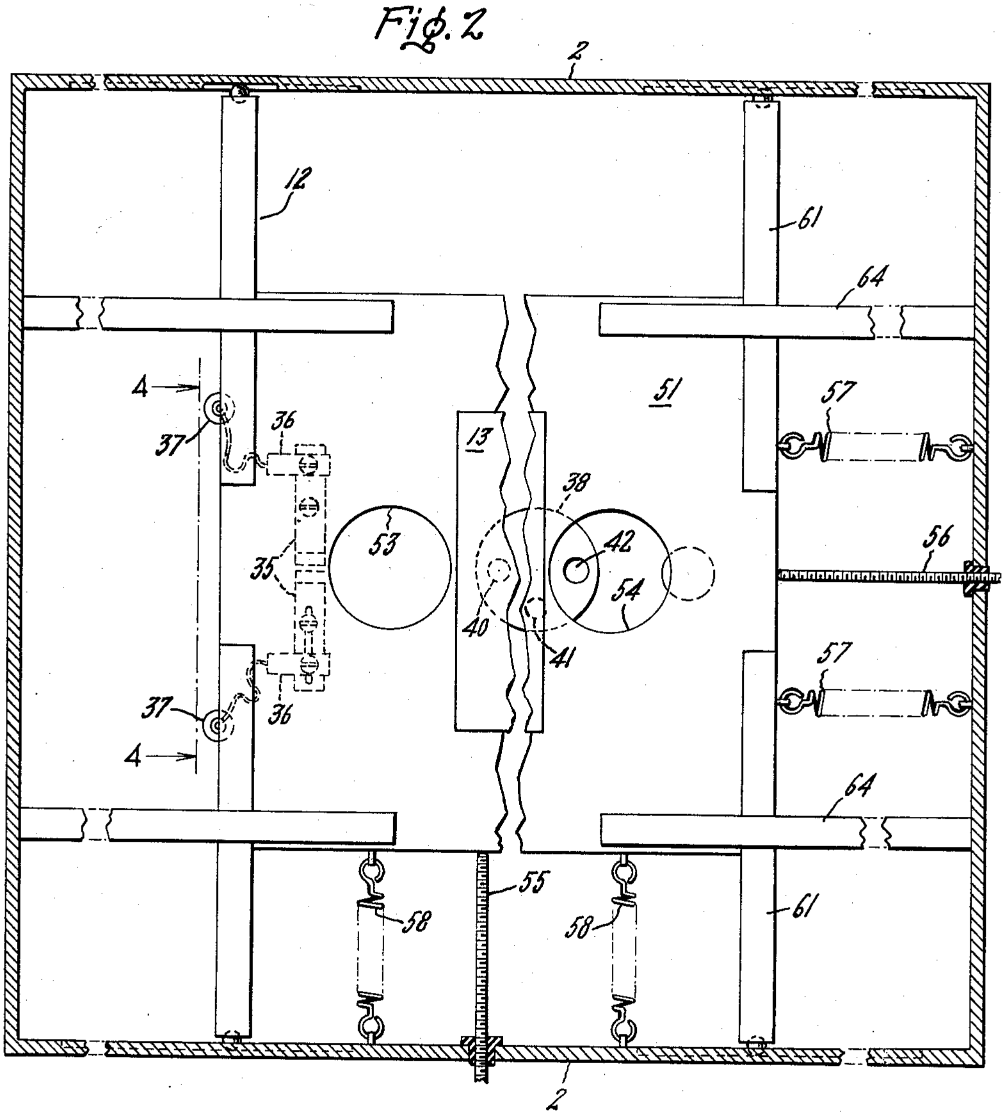
FIGURE 2 is a sectional view of a portion of the apparatus of FIGURE 1, taken along the lines 2—2 of that figure.

The positioning means 12 which supports the thermoplastic storage means 13 is actuated from suitable driving means to position the storage means in the desired manner during various stages of the operation and includes a shallow, inverted, U-shaped holder 51 having an opening 52 for retaining the storage element and two spaced circular openings 53 and 54 which receive the axially movable head 38 during beam monitoring. The holder 51, as may be seen clearly in FIGURE 2, is positioned by a pair of threaded push rods 55 and 56 acting against aligning springs 57 and 58 extending through the housing 2. Movement in two mutually perpendicular directions in the horizontal plane is thus achieved.

Figure 7:
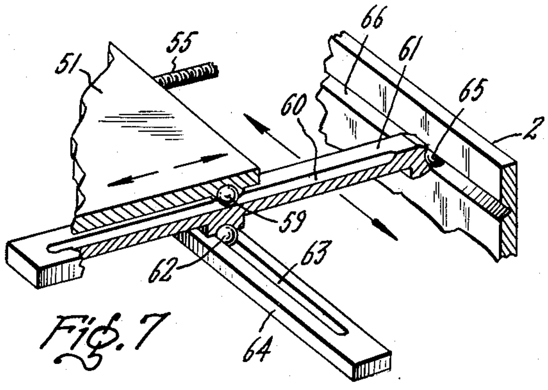
FIGURE 7 is a sectional view, partially in perspective, taken along lines 7—7 of FIGURE 1.

FIGURE 7 illustrates, in perspective, a portion of the drive mechanism for moving the holder 51 in two directions in the horizontal plane. To this end, the holder 51 is supported on balls 59 adapted to slide along grooves 60 in upper guide members 61 upon application of force from the rod 55 to the holder 51. The upper guide 61 is, in turn, supported on balls 62 disposed for sliding movement along grooves 63 in lower guide member 64 to move the holder 51 in a normal direction upon actuation of the rod 56, not shown. In this manner the upper guide 61 and the holder 51 move as a unit along grooves 63 in the direction indicated by the spaced arrowheads.

To facilitate movement of the upper guide 61 along the wall of the housing 2, the ends of the guide 61 have balls 65 secured thereto, which balls ride in tracks 66 in the housing wall.

A viewing means in addition to the microscope 44 may be provided where the magnification ratio of the microscope 44 is limited due to the long working distance between the storage element and the objective lens of the microscope 44 occasioned by the presence of the monitoring assembly 38. A second light microscope 70, indicated in phantom, may be positioned closely adjacent to the cover plate 11. A source of light such as an incandescent bulb 17 projects a beam of light into the interior of the housing through a window 72 onto a mirror 73. The beam is reflected by the mirror and passes through a transparent plate 74 to the microscope 70.

The beam of light is diffracted by the deformations on the storage medium 13 which may be moved into the beam path projecting a diffracted light pattern onto the microscope 70. In this manner, the stored data may be monitored by observing the color diffraction pattern produced by the deformations on the storage medium.

Figure 3:
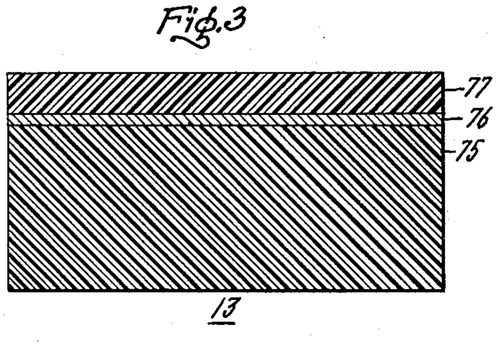
FIGURE 3 is an enlarged sectional view of a thermoplastic storage medium utilized with the apparatus of FIGURE 1.

The thermoplastic storage means 13, referred to briefly in describing the apparatus of FIGURE 1, is shown in detail in FIGURE 3. One satisfactory embodiment of a storage medium comprises a base material 75 which is optically clear, smooth, and non-plastic at temperatures up to at least 150° C. The thickness of this base material is not critical and excellent results have been obtained from a layer 4 mils thick. One suitable material for the base is an optical grade of polyethylene terephthalate sold under the trade name Cromar. Similarly, an optically clear plastic sold under the trade name Mylar, as well as a large class of transparent materials such as glass, are also suitable for use as a base material. A thin conducting substrate 76, such as cuprous iodide, is provided for heating a layer of thermoplastic material 77 which is exposed to the electron beam and positioned above the cuprous iodide. The layer of cuprous iodide must be optically transparent so that light may be transmitted therethrough during readout of the stored information. The thermoplastic layer 77 upon which the desired deformation patterns are formed must be optically clear, radiation resistant, of high resistivity and have substantially infinite room temperature viscosity and a relatively low fluid viscosity at a temperature of 100–150° C. One satisfactory thermoplastic material is a blend of polystyrene, m-terphenyl, and a copolymer of 95 weight percent of butadiene and 5 weight percent styrene. Specifically, the composition may be 70 percent polystyrene, 28 percent m-terphenyl and 2 percent of the copolymer.

The thermoplastic storage medium illustrated in FIGURE 3 may be prepared by application of a thin film of metallic copper to the surface of the base material 75 and then immersing the now copper coated base material in an iodine vapor to form the desired cuprous iodide film. For a more detailed description of a method and apparatus for producing this cuprous iodide film, reference is hereby made to Patent No. 2,756,165, entitled "Electrically Conducting Films and Process for Forming the Same," D. A. Lyon, issued July 24, 1956.

After formation of the cuprous iodide layer, the thermoplastic film 77 may be prepared by forming a 10 percent solid solution of the blend in toluene and coating the cuprous iodide film with this solution. The toluene is evaporated by air drying and by pumping in vacuum to produce the final composite article having the thermoplastic film on the surface. The film thickness of the thermoplastic film can vary from about 0.01 mil to several mils, with the preferred thickness being approximately equal to the spacings between the deformations formed in the surface thereof.

The operation of the apparatus of FIGURE 1 may be described as follows:

Initially, the electron beam is deflected by the "hold" deflection plates 29 to impinge on the Faraday cage 30. The storage element support and positioning means 12 is positioned by means of the push rods so that one of the passages 53 or 54 is aligned with the monitoring means 38 to ready the assembly to monitor the beam characteristics prior to storage. The electron writing beam is caused to impinge upon the monitoring means by removing the "hold" deflection voltage on the plate 29. By rotating the monitoring means 38 and selectively bringing the various monitoring elements into alignment with the electron beam, the beam characteristics such as focal plane, beam shape and beam current distribution, as well as secondary effects due to lens astigmatism and aberration may be determined and the optimum operating conditions achieved by adjustment of the voltages on the objective lens assembly, etc. After the beam characteristics have been determined and adjusted to provide the optimum operating characteristics, the target support and positioning means 12 is driven by means of the push rods to position the thermoplastic storage means 13 in the path of the electron beam. The deflection voltages are now applied to the horizontal and vertical deflections plate pairs 25, 26, 27, and 28 to initiate the storage process. These deflection voltages may be supplied directly from a circuit such as is disclosed in application Serial No. 756,775, Wolfe et al., entitled "Thermoplastic Film Data Storage Equipment," filed August 25, 1958, now abandoned and refiled as continuation application Serial No. 263,442—filed March 7, 1963, and assigned to the assignee of the present invention, which utilizes the electron beam storage means disclosed in the instant application.

As disclosed in the above identified Wolfe et al. application, the beam is deflected both in the horizontal and vertical plane to produce an area scan. The horizontal sawtooth deflection voltage however, is modulated by a high frequency sinusoidal voltage to produce a velocity modulation of the beam in the horizontal plane to control the beam speed during each horizontal beam scan. By periodically varying the beam the dwell time of the beam at various points in each horizontal scan is correspondingly varied. Hence, the number of electrons deposited on the thermoplastic by the beam at the various positions varies with the beam speed producing alternate areas of high and low electron density. By varying the frequency of the modulation voltage, the spacing between the areas of high electron density and hence, the desired pattern on the surface of the thermoplastic material may be varied.

Alternatively, rather than deflecting the beam both in the horizontal and vertical planes, it is possible to deflect the beam in one direction only, and to scan mechanically in the other direction by moving the information storage means 13. In this latter case the target support and positioning means 12 is driven by a servo mechanism actuated from a computer system such as is disclosed in the above identified Wolfe et al. application. It is to be understood, however, that many and varied combinations of electronic and mechanical scanning systems can be utilized in order to store the information.

Figure 8:
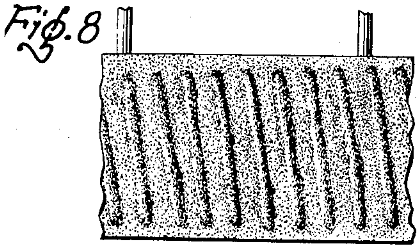
FIGURE 8 is a reproduction of a typical deformation pattern produced by the writing assembly illustrated in FIGURE 1.

After the electron charge pattern has been deposited on the surface of the thermoplastic by the beam, the desired deformation pattern is developed by aligning the thermoplastic storage means 13 with the R.F. electrodes 35. The radio frequency field produced by the electrodes induces an eddy current in the cuprous iodide layer 76 which heats the thermoplastic layer 77 sufficiently to soften it. With the thermoplastic thus softened, the electrostatic forces between the electrons and the conductive layer produce depressions on the now pliable softened surface. As the thermoplastic storage means cools, the deformations are frozen to produce a deformation pattern such as that illustrated in FIGURE 8 which is a reproduction of a photograph of such a pattern.

As pointed out previously, in order to achieve the extremely small deformation spacings required for high storage density, spacing of the electron charge pattern on the surface of the storage medium must also be very small. This in turn requires an electron writing beam having minute cross sectional areas in the range of 5–.5 microns. Hence, an electron objective lens 21 of very short focal length is required to demagnify the electron writing beam. Furthermore, the objective lens assembly 21 must be positioned between the thermoplastic storage means 13 and the beam deflecting means 24, otherwise the desired small beam cross section cannot be achieved since the focal length of the lens 21 would have to be long enough to permit the physical interposition of the deflecting means 24.

Figure 9:
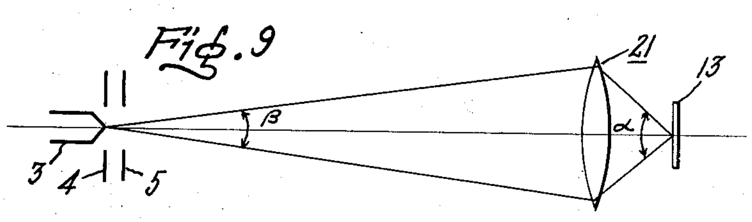
FIGURE 9 is a schematic helpful in understanding the operation of a portion of the apparatus illustrated in FIGURE 1.

FIGURE 9, which is a schematic illustration, is useful in understanding the effects of the spatial relationship of lens 21 and storage means 13 on the beam demagnification powers of the lens 21. Referring to FIGURE 9 directly, the filament 3, the thermoplastic storage means 13, and the lens 21, shown schematically, are illustrated. The demagnifying effects of the lens 21 may be defined by the equation $$M=\frac{\alpha}{\beta}$$

where $M$=demagnification $\beta$=the solid angle relative to the optical axis of the electron beam emitted from the filament 3

$\alpha$=the solid angle with respect to the optical axis of the beam focussed on the storage element 13, dependent on the focal length of the lens and hence, the distance between the lens and element 13.

It is apparent that the shorter the focal length of the lens 21 and thus the closer the storage element to the lens, the larger the angle $\alpha$ and the greater the demagnification of the electron beam, i.e., $M>>1$.

Figure 10:
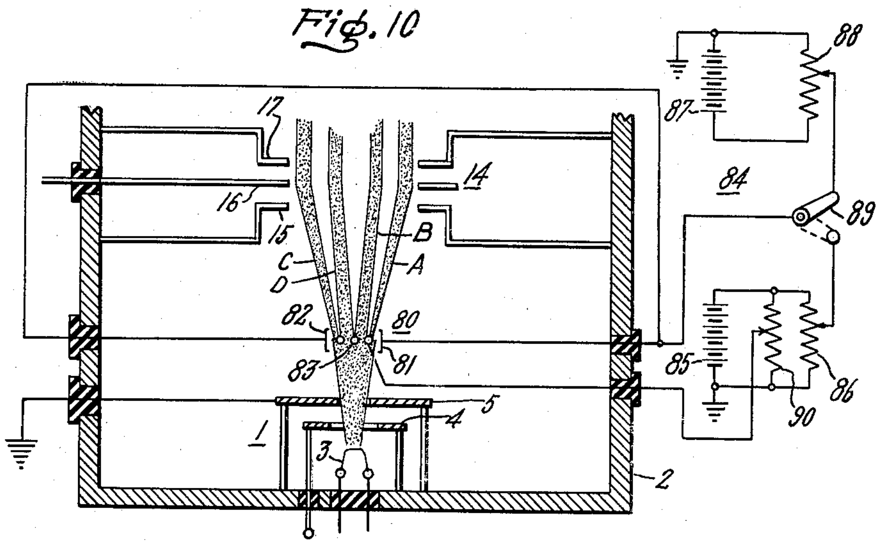
FIGURE 10 is a fragmentary sectional view of an alternative construction for the electron writing beam generating means.

In the apparatus illustrated in FIGURE 1, the spacing between the deformations is produced by a single velocity modulated electron beam. An alternative approach is possible by generating a multiplicity of spaced beams to deposit the electron pattern instantaneously. By varying the spacing between the beams the desired electron pattern and deformation spacing may be controlled. FIGURE 10 is a fragmentary showing of an apparatus incorporating such a beam splitting device wherein like parts are identified by like reference numerals. Thus, an electron gun assembly 1 positioned at one end of an evacuated housing 2, produces a diverging flat beam of electrons. A condenser lens assembly 14 converts the electrons into the slightly converging or parallel beams. Positioned between the condenser lens assembly 14 and the electron gun 1 is a beam splitting instrumentality 80 which acts as a multiple beam source by converting the beam from the gun 1 into a multiplicity of spaced beams. This beam splitter includes compressor plates 81 and 82 and a number of beam splitting grids 83 in the beam path which split the beam from the electron gun 1 into a number of individual beams A, B, C, and D, etc. By varying the potential on plates 81 and 82, the spacing between the beams A, B, etc., passing through the aperture in the condenser lens assembly 14 may be varied. To this end, the compressor plates 81 and 82 are connected to a source of variable positive potential 84. The potential source 84 includes a first voltage source such as a battery 85 shunted by a potentiometer resistance 86 and second battery 87 shunted by a potentiometer resistance 88. The compressor plates are selectively connected to a tap on the potentiometer resistances 86 and 88 through a movable switch 89 while the grid members 83 are connected to a point on a second potentiometer resistance 90 in shunt with battery 85 to maintain the grids 83 at fixed potential relative to the plates 81 and 82.

The individual beams emerging from the beam splitter 80 and the condenser lens 14 are deflected and focussed onto a thermoplastic storage means by a deflecting means and objective lens assembly, not shown, illustrated in FIGURE 1.

For simplicity of illustration and explanation, only four beams are shown in FIGURE 10. However, any desired number of beams may be utilized depending on the circumstances, with six beams being preferred where binary information in the form of discrete bits is to be stored. Furthermore, the mechanical switch 89 may obviously be replaced by an electronic switch such as a bi-stable multivibrator controlled from a computer to apply different voltages selectively to the compressor plates. Also, in some circumstances, the switch means may be eliminated entirely and the beam spacing controlled directly from a utilization device such as a computer by applying positive voltages of different amplitudes selectively to the compressor plates 82.

In the arrangement illustrated in FIGURE 1 the target support and positioning means 12 is illustrated as being movable in two mutually perpendicular directions in the horizontal plane to provide positioning in $x$-$y$ coordinates. However, the thermoplastic storage medium may be rotatably moved and FIGURE 11 illustrates a fragmentary view of such an alternative embodiment in which like parts have similar reference numerals. A disc shaped thermoplastic storage means 96 is fastened to a shaft 97 which extends through a cover plate 91 into the interior of an evacuated housing 2. The storage element 96 is accessible to an electron writing beam which is focussed thereon by an objective lens assembly 21, shown schematically, to produce an electron pattern on the thermoplastic surface of the disc. The disc 96 is of the same construction as the thermoplastic storage means illustrated and described with reference to FIGURE 3.

A pair of radio frequency electrodes 102 fastened to the cover plate 91 by means of insulating spacers 103 comprise a means to develop the deformations from the charge pattern by heating the thermoplastic layer. The electrodes 102 are so positioned with respect to the disc 96 that selected portions thereof may be aligned with the electrodes by rotation of the disc.

A drive shaft 98 driven from a selsyn motor 99 imparts rotary motion to the shaft 97 to which the disc is secured through bevel gears 93. The selsyn 99 is controlled directly from a computer to position the disc 96.

Such a control system for the selsyn 99 is disclosed in the above identified Wolfe et al. application as part of the overall computing apparatus.

Lateral movement of the disc 96 with respect to the electron beam axis in order to expose the disc at various radial distances is provided by means of positioning screws 92 which move the entire cover plate 91. In addition, a sector 105 of the disc 96 is removed in order to permit periodic access of the electron writing beam to a beam monitoring assembly 38. Thus, when the beam is to be monitored the disc 96 is rotated until the sector 105 is aligned with the beam monitor to permit passage of the beam.

The beam monitor assembly 38 is of the same construction as the one illustrated in FIGURE 1 and described in connection therewith and includes a phosphor screen 40, a relay lens 42 and a beam shadow projection means, not shown. To summarize briefly, these various elements are useful in determining such beam characteristics as shape, focal plane, current distribution, etc., as well as providing visual observation of the thermoplastic disc 96 during various stages of the storage process.

In the arrangements illustrated in FIGURES 1 and 11, the means to develop the deformation patterns from the charge patterns is disclosed as a radio frequency heating means which induces eddy current in the cuprous iodide conducting layer. FIGURE 12 illustrates a fragmentary sectional view of an alternative arrangement wherein radiant energy in the red and infrared range is used to heat and soften the thermoplastic. There are a number of advantages in such a heating system, one of which is a simpler storage element construction since it is no longer necessary to utilize a conducting cuprous iodide layer to produce the heating. Hence, structural and fabricating complexities of the storage element are reduced. In addition, the thermoplastic element may be heated without changing position since the heating element may be positioned outside of the chamber. Furthermore, the optical heating means may also be utilized to illuminate the storage medium and the electron emitting filament need no longer be used for this purpose.

Referring now to FIGURE 12 directly, a thermoplastic information storage element 110, comprising an optically transparent base and a thermoplastic surface layer, is secured to a cover plate 111 in any suitable manner. An electron writing beam impinges upon the thermoplastic storage element after being focussed and demagnified by a condenser lens 21, shown schematically, to produce the desired electron patterns. Positioned above the cover plate 111 is an optical heating means 112 which focusses a beam of radiant energy onto the back of the storage element 110 to heat and soften the thermoplastic. The heating means 112 consists of a housing 113, a passage 114 in the housing having a collimating lens 115, positioned therein to project a beam of radiant energy having a substantial infrared content from an intense arc source 116 or the like, onto a fixed annular ring mirror 117 inclined at an angle of 45 degrees to the vertical. The mirror 117 guides the light in the direction of the arrows through an annular condenser lens 119 retained in an externally threaded support 120 which engages a corresponding threaded portion in the interior of the main housing. The annular lens 119 is concentric with and surrounds an objective mounting tube 121 which supports an objective lens assembly 122. Radiant energy is focussed onto the storage element 110 by the annular condenser lens 119 to produce the desired heating to soften the thermoplastic material and produce the deformation pattern. In addition, the radiant energy focussed which is in the visible range is diffusely reflected from the storage element and projected by the observation objective lens 122 onto a viewing means which may be a light microscope or a screen 123. The reflected light is diffracted by the deformation pattern and produces upon the screen 123 a color pattern depending upon the thermoplastic deformation spacing.

In addition, the arrangement illustrated in FIGURE 12 includes a monitoring means 124 secured to the cover plate 111 and positioned adjacent to the storage element. The monitoring means 124 includes a phosphor screen 125 which produces a fluorescent image of the impinging beam useful in determining the beam shape and current distribution. A beam shadow projection assembly 126 is also provided and includes an electron scattering gold target 127, a silver grid structure 128, and a phosphor screen 118 upon which an enlarged shadow image of the grid 128 is projected. As was explained previously with reference to FIGURE 1, the sharpness of the projected shadow image of the grid 128 is observed and the operating potential of the electrostatic objective lens 21 adjusted to focus the beam in the plane of the storage element 110.

The monitoring assembly 124 is periodically aligned with the electron beam to determine the various beam characteristics by lateral movement of the cover plate 111 through any suitable positioning means such as the positioning screw rods shown in FIGURE 11. The individual elements of the beam monitor 124 are observed through the optical objective lens 122 of the optical assembly 112 to facilitate adjustment of the various parameters to provide optimum operating conditions.

In utilizing radiant energy heating means the spectral composition of the radiant energy source should be so chosen as to have a substantial portion thereof in the non-visible wavelengths for which the thermoplastic material is a good absorber. Since such thermoplastics as those referred to in this application are normally good infrared or near red absorbers the illumination source must be chosen to have a substantial portion of its radiation in these wavelengths.

It is clearly apparent from the description of the apparatus of FIGURE 12 that the system illustrated there makes possible simultaneous writing, heating and developing, and monitoring without changing position of the storage medium. The significance of this achievement is in simplifying the operation of the system in providing all operations at the same position.

In the apparatus of FIGURE 12 the outer annular lens system 119, etc., was utilized to focus light onto the thermoplastic medium in order to produce the desired heating. It is of course possible to reverse the procedure using the outer annular lens system to pick up the diffracted light and produce a real image of the thermoplastic surface, while utilizing the central passage to focus radiant energy from the source onto the thermoplastic medium. FIGURE 13 illustrates such an apparatus wherein like parts are referred to by like reference numerals. Thus, an optical heating element 112, comprising a housing 113, is positioned to transmit radiant energy from an arc source 116 down the central passage of the housing onto a thermoplastic storage element 110 supported on a cover plate 111. The optical means which is of the same construction as that shown in FIGURE 12, contains a number of lens elements, illustrated in phantom, such as an annular condenser ring 119 which projects diffracted radiant energy in the visible range from the storage element 110 in the direction of the arrows onto a pair of fixed mirror segments 118 and then through a collimating lens 114 and a filter element 129 onto a screen 101 to produce a color image from the first order spectra of the energy diffracted by the thermoplastic deformations.

In the various embodiments of the invention discussed hitherto, the thermoplastic data storage means has been illustrated either as being disc shaped or a flat plate. It may be desirable under certain circumstances to use drum shaped thermoplastic storage means, and particularly where combined electronic and mechanical scanning of the storage medium is desired. FIGURE 14 illustrates such an information storage system utilizing a drum shaped thermoplastic storage medium. Fastened to a housing 2, only a portion of which is shown, is a storage medium chamber 130 which contains an open ended thermoplastic overhang drum 131, the outer surface of which is composed of a thermoplastic material upon which the desired information is to be stored. The overhang drum 131 is mounted for rotational and axial movement upon a drive shaft 132 extending through the wall of the chamber 130 and supported in a pair of sleeve bearing bushings 133 and 134. An O ring vacuum seal 135 surrounding the shaft 132 is provided to maintain the vacuum in the interior of the chamber. The drum may thus be transported to make different portions thereof accessible to an electron writing beam focussed on the drum by an electrostatic objective lens 21. The storage medium chamber 130 has a re-entrant portion 136 which is generally concentric with the storage drum and retains a radiant energy heating means 137 of the type illustrated in FIGURE 12, to permit beam writing, heating and deformation development at the same position. The heating means 137, illustrated schematically, comprises a source of radiant energy such as a suitable arc which projects a beam of energy through a collimating lens 139 onto an annular mirror 140, oriented at an angle of 45 degrees with the beam axis. The mirror reflects the energy onto an annular condenser lens 142 which focusses it onto the drum 131 through a light transparent window 143 in the wall of the re-entrant portion 136. An objective lens assembly 144 concentric with the annular lens 142 provides a path for reflected light from the drum to be transmitted to a mirror 145 and out to a viewing system, such as a microscope or an image receiving screen.

It is obvious that although the radiant energy heating means 137 is described as a device for developing the deformations in the drum 131 from an electron charge pattern by heating the thermoplastic layer to a softened state, this instrumentality may also be used as an erasing mechanism for eliminating erroneous or outdated information by heating and melting the thermoplastic to remove any existing deformation patterns.

The thermoplastic drum element 131 also contains a number of beam monitoring elements 146 and 147 which are periodically moved into alignment with the electron beam to determine the beam characteristics such as beam shape, etc.

Rotational and axial movement of the drum 131 may be provided from a drive servo mechanism of the type described in the Wolfe et al. application referred to previously.

Although writing, heating, developing and erasing at the same position as illustrated in the arrangement of FIGURE 14 is preferred, these functions may be carried out at different positions. FIGURE 15 shows such a construction wherein a housing 2, only partially illustrated, is maintained under vacuum and contains the instrumentalities for producing a finely focussed electron writing beam. An objective lens assembly 21, comprising the usual apertured lens elements, is positioned adjacent to a drum shaped thermoplastic storage medium 160 to produce a finely focussed electron beam for depositing the electron pattern on the surface of the thermoplastic drum. The thermoplastic drum assembly 160 is retained in a chamber 161 fastened in airtight relationship to the housing 2 and is mounted for rotational and axial movement on a drive shaft 148 extending through the walls of the chamber and supported in bearings 133, 134, and 151. The drive shaft 148 may be driven from a servo mechanism controlled from the computing or storage device disclosed in the copending Wolfe et al. application. Fastened to one end of the drum 160 is a short arcuate element 151 containing a pair of spaced beam monitoring elements 152 and 153. Monitoring element 152 consists of a fluorescent screen for determining the beam shape and beam current distribution, while monitoring element 153 is a beam shadow projection means of the type described previously with reference to FIGURES 1 and 11 and includes an electron scattering gold target, a 1500 mesh silver grid, and a phosphor target element. These beam monitoring means are periodically moved into alignment with the electron beam in order to observe and determine such beam characteristics as shape, focal plane, current distribution, etc. The drive shaft 148 has a split yoke 154 portion immediately above the elements 152 and 153 to permit observation of the effects of the electron beam on these elements.

Adjacent to the upper portion of the chamber is a means for developing and erasing information representing deformations. To this end, a radiant energy heating means 155 of the type illustrated in FIGURE 12 is positioned adjacent to a transparent opening or window 156 in the chamber 161. The heating means 155 is so located that heating and writing take place at different positions. The heating means 155 transmits radiant energy from an arc source, not shown, through a 45 degree oriented ring mirror 157 onto an annular condenser lens 159 which focusses the radiant energy onto the drum heating the thermoplastic and bringing it to a softened state either to produce deformations in accord with the charge pattern deposited at the surface by means of the electron writing beam or to erase such deformations. Reflected light is transmitted from the thermoplastic through the central objective lens portion onto a reflecting mirror 162 and a visual observation means such as a microscope, not shown, or any other similar viewing means. It is also clear that the head assembly of the instrumentality illustrated in FIGURE 15 is of much simpler configuration than that illustrated in FIGURE 14 with the attendant savings in manufacturing costs.

It has become apparent from the previous description that there has been provided a data storage apparatus utilizing a thermoplastic storage means which is capable of achieving higher storage densities than hitherto possible with thermoplastic means by utilizing extremely small diameter electron beam writing probes. Furthermore, a monitoring means is provided in the storage assembly which permits observation and determination of the beam characteristics to produce optimum operating conditions as well as continuous observation of the information storage medium during various stages of the storage process.

While particular embodiments of this invention have been shown, it will, of course, be understood that it is not limited thereto since many modifications in the instrumentality employed may be made. It is contemplated by the appended claims to cover any such modifications as fall within the true spirit and scope of the invention.

What we claim as new and desire to secure by Letters Patent of the United States is:

1. An information storage system for storing information on a deformable medium in the form of permanent physical deformations comprising, a deformable thermoplastic film storage means, means including a focussed charged particle writing beam for producing said information representing permanent deformations on said storage means in response to an electrical input, monitoring means comprising a beam monitor assembly including a phosphor screen for producing a visual representation of the beam shape and an electron scattering and grid structure for producing an enlarged projected shadow image of said beam, the said screen and grid structure being selectively useable as aforesaid, and means to cause said writing beam to impinge selectively on said monitoring and said storage means to determine the beam characteristics and storage conditions to achieve optimum operating conditions.

2. An information storage system for storing information from an electrical input quantity on a thermoplastic in the form of pre-determined permanent deformation patterns including a thermoplastic film storage means, means to produce an electron writing beam for forming an electron pattern on selected portions of said thermoplastic representing the desired deformation patterns, said thermoplastic storage means comprising a drum having an outer surface of thermoplastic material, means to heat said thermoplastic material to develop said deformation pattern from said electron pattern, means to rotate said drum to expose different portions thereof to said electron beam and said heating means respectively, monitoring means comprising a beam monitor assembly including a phosphor screen for producing a visual representation of the beam shape and an electron scattering and grid structure for producing an enlarged projected shadow image of said beam, the said screen and grid structure being selectively usable as aforesaid, and means to cause said writing beam to impinge selectively on said monitoring and said thermoplastic storage means to determine the beam characteristics and storage conditions to achieve optimum operating conditions.

3. An information storage system for storing information from an electrical input quantity on a thermoplastic in the form of predetermined permanent deformation patterns comprising a drum-shaped thermoplastic storage means, means to produce an electron writing beam impinging on said drum for forming an electron pattern on selected areas of said thermoplastic, means to heat said thermoplastic to develop said deformation pattern from said electron pattern, said last-named means comprising optical means for focusing radiant energy upon said drum, said writing beam and said heating means being positioned at different points on said drum, means to translate and rotate said drum to expose different areas successively to said beam and said heating means, monitoring means comprising a beam monitor assembly including a phosphor screen for producing a visual representation of the beam shape and an electron scattering and grid structure for producing an enlarged projected shadow image of said beam, the said screen and grid structure being selectively usable as aforesaid, and means to cause said writing beam to impinge selectively on said monitoring and said storage means to determine the beam characteristics and storage conditions to achieve optimum operating conditions.

4. An information storage system for storing information on a thermoplastic medium in the form of permanent deformation patterns comprising, a thermoplastic storage means, means to produce the information representing deformations on said storage means including an electron writing beam adapted to impinge on the storage means, heating means for heating said thermoplastic storage means to a substantial softened condition to permit the electrons written thereon to deform its surface, means for subsequently cooling the surface to permanently set the deformations, means for selectively subjecting the thermoplastic storage means to the electron writing beam, the heating means and to cooling, monitoring means for said beam, said monitoring means including a beam monitoring assembly comprising a phosphor screen for producing a visual representation of the beam shape and an electron scattering and grid structure for producing an enlarged projected shadow image of said beam to determine the beam focusing conditions, the said screen and grid structure being selectively usable as aforesaid, and means to cause the electron writing beam to impinge selectively on said monitoring and said thermoplastic storage means to determine the beam characteristics and storage conditions to achieve optimum operating conditions.

5. An information storage system for storing information on a thermoplastic medium in the form of permanent deformation patterns comprising, a thermoplastic storage means, means including an electron writing beam to produce the information representing deformations on said storage means, monitoring means responsive to said electron beam to observe said writing beam and further responsive to an aspect of said storage medium to observe the operating conditions continuously, said monitoring means including a beam monitor assembly to determine various beam characteristics comprising a screen for producing a visual representation of the electron beam to determine the beam shape and current distribution and beam shadow projection means for producing an enlarged projected shadow image of said beam, the said screen and beam shadow projection means being selectively usable as aforesaid, means for directly viewing said thermoplastic storage means during various stages of the storage process whereby optimum operating and storage conditions may be achieved, and means to cause said writing beam to impinge selectively on said monitoring and said storage means to determine the beam characteristics and storage conditions to achieve optimum operating conditions.

6. An information storage system for storing information on a thermoplastic medium in the form of permanent deformation patterns comprising a thermoplastic storage means, means including an electron writing beam to produce the information representing deformations on said storage means, monitoring means to observe said writing beam and said storage medium including a beam monitoring assembly for determining the characteristics of said electron beam, said assembly comprising a phosphor screen for producing a visual representation of the electron beam and an electron scattering and grid structure for producing a shadow projection of said beam at the storage means location, and said screen and grid structure being selectively usable as aforesaid, and means to cause said writing beam to impinge selectively on said monitoring and said storage means to determine the beam characteristics and storage conditions, and means for viewing said thermoplastic storage means directly during various stages of the storage process whereby optimum operating and storage conditions may be achieved.

7. An information storage system for storing information on a thermoplastic medium in the form of permanent deformation patterns comprising a thermoplastic storage means, means including an electron beam to produce the information representing deformations on said storage means, heating means for heating said thermoplastic storage means to a substantial softened condition to permit the electrons written thereon to deform its surface, means for subsequently cooling the surface to permanently set the deformations, means for selectively subjecting the thermoplastic storage means to the electron writing beams, the heating means and to cooling, monitoring means to observe said writing beam and said storage medium comprising a beam monitor assembly for determining the beam characteristics including an electron responsive screen for producing a visual representation of the electron beam to determine the beam shape and current distribution and an electron scattering and grid structure for producing an enlarged projected shadow image of said beam to determine the beam focusing conditions, the said screen and grid structure being selectively usable as aforesaid, means to cause said writing beam to impinge selectively on said beam shape and beam focus determining means to facilitate the determination of the beam characteristics at the point of impingement on said thermoplastic, and means to view said thermoplastic storage means directly during various stages of the storage process to maintain optimum operating and storage conditions.

8. In an apparatus for storing information on a thermoplastic medium by producing predetermined permanent deformation patterns, the combination comprising a thermoplastic storage means, means to produce an electron writing beam to deposit electrons on the surface of said thermoplastic representing the desired deformation pattern, means to heat said thermoplastic to develop said deformation pattern from said deposited electrons, said last-named means comprising optical means to project and focus a beam of radiant energy onto said thermoplastic whereby said thermoplastic is melted and said deformations are produced, monitoring means including a beam monitor assembly comprising a transparent phosphorous screen for producing a visual representation of the beam shape and an electron scattering and grid structure for producing an enlarged projected shadow image of said beam, the said screen and grid structure being selectively usable as aforesaid, and means to cause said writing beam to impinge selectively on said monitoring means and said storage means to determine the beam characteristics and storage conditions to achieve optimum operating conditions.

9. In an apparatus for storing information on a thermoplastic medium in response to an electrical input quantity by producing predetermined permanent deformation patterns, the combination comprising a thermoplastic storage means, means to produce an electron writing beam to deposit an electron pattern on the surface of said thermoplastic in response to said electrical quantity, means to heat said thermoplastic to develop said deformation pattern from said electron pattern, said last-named means comprising optical means to focus a beam of radiant energy having a substantial part of this energy in a portion of the spectrum which said thermoplastic absorbs, said radiant energy being focussed at the point of exposure of said thermoplastic to said electron writing beam whereby writing and development occur substantially simultaneously, monitoring means including a beam monitoring assembly comprising a phosphor screen for producing a visual representation of the beam shape and an electron scattering and grid structure for producing an enlarged projected shadow image of said beam, the said screen and grid structure being selectively usable as aforesaid, and means to cause said writing beam to impinge selectively on said monitoring and said storage means to determine the beam characteristics and storage conditions to achieve optimum operating conditions.

References Cited in the file of this patent

UNITED STATES PATENTS

| | | |
|---|---|---|
| 1,891,780 | Rutherford | Dec. 20, 1932 |
| 2,281,637 | Sukumlyn | May 5, 1942 |
| 2,391,450 | Fischer | Dec. 25, 1945 |
| 2,707,162 | Fries | Apr. 26, 1955 |
| 2,813,146 | Glenn | Nov. 12, 1957 |
| 2,861,166 | Cargill | Nov. 18, 1958 |
| 2,898,467 | Von Ardenne | Aug. 4, 1959 |
| 2,916,621 | Wittry | Dec. 8, 1959 |
| 2,985,866 | Norton | May 23, 1961 |

FOREIGN PATENTS

| | | |
|---|---|---|
| 384,258 | Great Britain | Feb. 4, 1931 |